(12) United States Patent
Hwang et al.

(10) Patent No.: US 12,516,671 B2
(45) Date of Patent: Jan. 6, 2026

(54) FAN MOTOR

(71) Applicant: LG Electronics Inc., Seoul (KR)

(72) Inventors: Jisu Hwang, Seoul (KR); Byungjik Kim, Seoul (KR); Eunji Hwang, Seoul (KR); Sunggi Kim, Seoul (KR); Yoonchul Rhim, Seoul (KR)

(73) Assignee: LG Electronics Inc., Seoul (KR)

( * ) Notice: Subject to any disclaimer, the term of this patent is extended or adjusted under 35 U.S.C. 154(b) by 159 days.

(21) Appl. No.: 18/466,403

(22) Filed: Sep. 13, 2023

(65) Prior Publication Data

US 2024/0125326 A1 Apr. 18, 2024

(30) Foreign Application Priority Data

Oct. 13, 2022 (KR) .................. 10-2022-0131680

(51) Int. Cl.
F04D 25/06 (2006.01)
F04D 29/056 (2006.01)
F16C 19/18 (2006.01)
H02K 5/173 (2006.01)

(52) U.S. Cl.
CPC ........... *F04D 25/06* (2013.01); *F04D 29/056* (2013.01); *F16C 19/18* (2013.01); *H02K 5/1735* (2013.01); *F16C 2360/46* (2013.01)

(58) Field of Classification Search
CPC ...... F16C 25/083; F16C 25/236; F16C 25/46; F04D 19/002; F04D 29/0462; F04D 29/059; F04D 29/0563
See application file for complete search history.

(56) References Cited

U.S. PATENT DOCUMENTS

| 2013/0223997 | A1 | 8/2013 | Childe et al. | |
| 2015/0152872 | A1* | 6/2015 | Horng | H02K 5/136 |
| | | | | 415/208.1 |
| 2015/0275962 | A1* | 10/2015 | Sakon | F16C 25/083 |
| | | | | 384/517 |
| 2024/0072602 | A1* | 2/2024 | Uchikawa | H02K 5/1735 |

FOREIGN PATENT DOCUMENTS

EP 2401516 3/2018

* cited by examiner

*Primary Examiner* — Kenneth J Hansen
(74) *Attorney, Agent, or Firm* — Fish & Richardson P.C.

(57) ABSTRACT

A fan motor includes a rotating shaft on which an impeller is mounted, a motor unit for driving the rotating shaft, a plurality of bearings supporting the rotating shaft, a spring serially disposed between the plurality of bearings to axially apply force to an outer ring of one of the plurality of bearings, and a cylinder brought into contact with the spring to transfer elastic pressing force of the spring to the outer ring of the bearing. Accordingly, by applying a preload to the outer ring of the bearing, a ball of the bearing can be restricted from moving axially and radially between the outer ring and an inner ring of the bearing. The spring has a structure that is surface-contactable and has a length shorter than a diameter, and does not require a separate cartridge such as a sleeve for fixing the spring.

15 Claims, 10 Drawing Sheets

FAN MOTOR

CROSS-REFERENCE TO RELATED APPLICATION

Pursuant to 35 U.S.C. § 119(a), this application claims the benefit of the earlier filing date and the right of priority to Korean Patent Application No. 10-2022-0131680, filed on Oct. 13, 2022, the contents of which are incorporated by reference herein in their entirety.

TECHNICAL FIELD

The present disclosure relates to a fan motor, and more particularly, to a fan motor capable of easily securing reliability of a bearing.

BACKGROUND

Electric motors may be installed in home appliances such as cleaners, hair dryers, and the like.

A cleaner or a hair dryer may generate rotational force by using an electric motor as a power source.

For example, an electric motor may be fastened to a fan. The fan may generate airflow by being rotated as driving force is applied from the electric motor.

A handy stick cleaner or a hair dryer is operated while a user directly holds it by hand.

In order to enhance user portability and convenience, there is a need to reduce size and weight of a cleaner or a hair dryer.

In order to reduce a weight of a fan motor of a cleaner, it is preferable to use a plastic material, instead of a metal material, as a material for producing a housing.

On the other hand, a plurality of bearings rotatably support a rotating shaft. Such bearings may have a double-side bearing support structure and a center bearing support structure depending on positions of the bearings disposed on a rotating shaft.

FIG. 1 is a conceptual view illustrating a both-side bearing supporting structure. FIG. 2 is a conceptual view illustrating a center bearing supporting structure.

According to a both-side bearing supporting structure of FIG. 1, a plurality of bearings 2a and 2b are mounted on both sides of a rotating shaft with a permanent magnet interposed therebetween. The rotating shaft may rotate while being supported by the plurality of bearings 2a and 2b.

The both-side bearing supporting structure is configured such that the bearings 2a and 2b are disposed on both sides of the rotating shaft with the relatively heavy permanent magnet interposed therebetween, which provides an advantage of stably supporting the rotating shaft.

However, the both-side bearing supporting structure separately requires a first housing supporting the first bearing 2a as one of the plurality of bearings 2a and 2b, and a second housing supporting the second bearing 2b as another one of the plurality of bearings 2a and 2b, which causes a disadvantage in view of reducing size and weight of a fan motor.

Also, when the two different housings are assembled, an axial alignment between the first bearing 2a and the second bearing 2b may be failed.

According to a center bearing supporting structure of FIG. 2, a plurality of bearings 11 and 12 are mounted on the middle of a rotating shaft 10 between an impeller 14 and a permanent magnet 13. The rotating shaft 10 may be supported and rotated by the plurality of bearings 11 and 12.

In the case of the center bearing supporting structure, the plurality of bearings 11 and 12 may be disposed adjacent to each other and supported by one housing. This excludes the need of two separate housings, which is advantageous in reducing size and weight of a fan motor.

In addition, in the case of the center bearing supporting structure, since the plurality of bearings 11 and 12 are accommodated and supported in the one housing, an axial mis-alignment between the bearings 11 and 12 is not caused.

A bearing supporting a rotating shaft 20 may be configured as a ball bearing 24.

FIG. 3 is a conceptual view for explaining the problem of the ball bearing 24 mounted on the rotating shaft 20.

The ball bearing 24 includes an inner ring 21, an outer ring 22, and a plurality of balls 23. The inner ring 21 is configured to surround the rotating shaft 20. The outer ring 22 is disposed outside the inner ring 21 and surrounds the inner ring 21. The plurality of balls 23 are disposed between the inner ring 21 and the outer ring 22. The plurality of balls 23 may support the inner ring 21 so that the rotating shaft 20 and the inner ring 21 are rotatable relative to the outer ring 22.

Ball accommodating grooves 25a and 25b are formed concavely on an inner circumferential surface of the outer ring 22 and an outer circumferential surface of the inner ring 21, respectively. The ball accommodating grooves 25a and 25b surround portions of the ball 23. An oil accommodating space S is defined between the ball 23 and the ball accommodating grooves 25a and 25b of the outer ring 22 and the inner ring 21. Oil accommodated in the oil accommodating space S may reduce friction between the outer ring 22 and the inner ring 21 and the ball 23.

However, the ball 23 may move minutely to one side in the oil accommodating space between the outer ring 22 and the inner ring 21.

Due to the movement, the ball 23 rubs against the outer ring 22 and the inner ring 21 during high-speed rotation, so as to be worn. In addition, there is a problem in that reliability of the bearing is lowered due to vibration and noise of the bearing.

In order to solve this problem, force (preload) may be applied to the outer ring 22 in the axial direction, to minimize such minute movement of the ball 23 between the outer ring 22 and the inner ring 21.

For example, in the case of the center supporting structure, it may be considered that a rigid cylinder is interposed between two ball bearings 24 to apply preloads to the two ball bearings 24.

The rigid cylinder may be configured to pressurize (apply a preload) the outer rings 22 of the two bearings in advance in the axial direction, so that a distance between the outer rings 22 of the two bearings becomes longer than a distance between the inner rings 21 of the two bearings.

However, in the method of applying the preload by interposing such a rigid body between the two ball bearings 24, the dispersion of the preload increases according to a press-fit depth of the bearings. This also causes a great problem that a preload amount changes greatly due to thermal deformation of the bearings and the rotating shaft 20 during operation of the fan motor.

Prior Art Patent Document US 2013/0223997 A1 (published on Aug. 29, 2013, hereinafter, referred to as 'Patent Document 1') discloses a bearing assembly. The bearing assembly includes a first bearing, a second bearing, a spring, and a sleeve. A sleeve surrounds the spring and the bearing. The spring presses each of the first and second bearings.

However, in the bearing assembly of Patent Document 1 including the sleeve that surrounds the bearing and the spring, the fan motor increases in size by more than the thickness of the sleeve, and a manufacturing cost increases due to increases in material cost and assembly processes, caused by an increase in components.

Prior Art Patent Document EP 2 401516 B1 (registered on Mar. 7, 2018, hereinafter, referred to as 'Patent Document 2') discloses a rotor assembly. The rotor assembly includes an impeller-mounted shaft, a rotor core, and a bearing cartridge. The bearing cartridge is mounted between the impeller and the rotor core. The bearing cartridge includes a pair of bearings, a spring, and a sleeve.

The sleeve surrounds the bearings. The spring applies a preload to each of the pair of bearings.

However, the rotor assembly of Patent Document 2 further includes the sleeve surrounding the bearings and the spring, thereby increasing a diameter of the bearing cartridge. Accordingly, Patent Document 2 has disadvantages in reducing the size and weight of the fan motor.

SUMMARY

The present disclosure has been invented to provide a fan motor having a structure capable of solving the above problems.

A first aspect is to provide a fan motor having a structure that is capable of applying a preload to a bearing.

A second aspect is to provide a fan motor having a structure that is capable of significantly contributing to reduction of size and weight of the fan motor.

A third aspect is to provide a fan motor having a structure that is capable of fixing a bearing without the need of a separate cartridge surrounding a bearing and a spring.

A fourth aspect is to provide a fan motor having a structure that is capable of easily securing reliability of a bearing by virtue of less preload dispersion according to a press-fit depth of the bearing and a small change in preload amount due to thermal deformation.

A fifth aspect is to provide a fan motor having a simplified structure with an improved assembly property.

As a result of intensive research, the inventors of the present disclosure can achieve solution to the problems of the present disclosure and the aforementioned first to fifth aspects by the following embodiments of the present disclosure.

(1) In order to achieve the first, second, and fourth aspects, a fan motor according to one embodiment of the present disclosure includes: a rotating shaft to which an impeller is mounted; a motor unit including a rotor connected to the rotating shaft and a stator enclosing the rotor, and driving the rotating shaft; a plurality of bearings each having an inner ring coupled to the rotating shaft, an outer ring spaced apart from the inner ring with a gap radially outward, and a plurality of balls disposed to be rollable in contact between the outer ring and the inner ring, and supporting the rotating shaft; a spring having one axial side surface in contact with one axial side surface of the outer ring of any one of the plurality of bearings; and a cylinder having one axial side in contact with another axial side surface of the spring, and another side in contact with one axial side surface of the outer ring of another one of the plurality of bearings. According to this, the spring and the cylinder apply an axial preload to the plurality of bearings, so that the ball is supported in two-point contact between the outer ring and the inner ring without a minute movement in axial and radial directions.

(2) In the item (1), the spring may be formed in a cylindrical shape enclosing the rotating shaft, and an axial length of the spring may be shorter than a diameter of the spring. This can shorten the length of the spring, thereby reducing a manufacturing cost. Since a movable range of the spring is shortened, durability and reliability can be improved.

(3) In order to achieve the third and fifth aspects, in the item (1), the cylinder may surround the rotating shaft, and a spring mounting part to which the spring is mounted may be disposed on the one axial side of the cylinder. This can exclude the need of a separate cartridge, such as a sleeve, for fixing the spring.

(4) In the item (3), the spring mounting part may protrude radially inward from the one axial side of the cylinder, a fixing protrusion may protrude from an inner end portion of the spring mounting part toward the bearing, and the another axial side surface of the spring may surround the fixing protrusion and may be fitted to the fixing protrusion. According to this, the fixing protrusion can fix the spring with a simple structure.

(5) In the item (3), a diameter of the cylinder may be equal to or smaller than a diameter of the bearing. According to this, the cylinder can be in contact with the spring without a separate structure, so as to transfer the preload received from the spring to the bearing. In addition, the structure for applying an axial preload to the bearing can be simplified.

(6) In the item (1), the spring and the cylinder may be mounted between the outer rings of the plurality of bearings, a sum of lengths of the spring and the cylinder before being mounted may be larger than a spaced distance between the inner rings of the plurality of bearings, and the spring and the cylinder after being mounted may press the outer rings of the plurality of bearings in the axial direction, and a portion of the outer ring of each of the plurality of bearings may protrude axially from one axial side surface of the inner ring of each of the plurality of bearings by pressing force of the spring and the cylinder. According to this, the spring can move the outer ring in the axial direction by using elastic restoring force.

(7) In the item (6), a virtual straight line, which passes in a radial direction of the ball through a first contact point where the outer ring and the ball are in contact with each other and a second contact point where the inner ring and the ball are in contact with each other, is inclined with respect to the axial direction. According to this, a first bearing accommodating groove formed inside the outer ring is formed as a curved surface in an arcuate or spherical shape, and a second bearing accommodating groove formed inside the inner ring is formed in the curved surface in the arcuate or spherical shape. The ball is formed in the spherical shape. One side of the ball rolls in contact with the first bearing accommodating groove, and another side of the ball rolls in contact with the second bearing accommodating groove. The ball may move in the axial and radial directions between the first bearing accommodating groove and the second bearing accommodating groove.

(8) In the item (1), the spring may include a ring portion disposed to be axially spaced apart from the one axial side surface of the outer ring and surrounding the rotating shaft; and an arm portion protruding from the ring portion toward the bearing to be in contact with the one axial side surface of the outer ring, and elastically deformed in the axial direction by the contact. According to this, the arm portion can store elastic pressing force through the contact with the outer ring of the bearing and apply a preload to the outer ring of the bearing.

(9) In the item (8), the arm portion includes a first arm portion and a second arm portion connected to outside of the ring portion, extending from the outside of the ring portion in opposite directions along a circumferential direction, and forming a pair, the first arm portion and the second arm portion are provided in a plurality of pairs, which are spaced apart from each other in a circumferential direction of the ring portion, and each of the first arm portion and the second arm portion includes a connecting part connected to the outside of the ring portion, an inclined part inclined to protrude toward the bearing from the connecting part, and a contact part disposed on the inclined part and coming in contact with the one axial side surface of the outer ring. According to this, the connecting part can support the inclined part. The inclined portion is elastically deformable in the axial direction. The contact part can transmit force to the outer ring.

(10) In the item (1), the spring may include: a first contact part in contact with the one axial side surface of the outer ring; a second contact part spaced apart from the first contact part in the axial direction and coming in contact with the one axial side surface of the cylinder; and an elastic part disposed between the first contact part and the second contact part to connect the first contact part and the second contact part, and elastically deformed according to a distance between the first contact part and the second contact part. According to this, the elastic part can be compressed as the distance between the first contact part and the second contact part is shortened, and can extend as the distance between the first contact part and the second contact part is increased.

(11) In the item (10), the first contact part and the second contact part may be formed in a circular shape, the elastic part may include: a first curved portion extending in a circumferential direction of the first contact part or the second contact part and convex toward the first contact part; and a second curved portion extending in the circumferential direction of the first contact part or the second contact part, concave toward the second contact part, and alternately disposed with the first curved part along the circumferential direction, the elastic part may be provided in plurality, and the plurality of elastic parts overlap each other in the axial direction, and the first curved part and the second curved part disposed on different layers in the axial direction may be in contact with each other or spaced apart from each other in the axial direction. According to this, the contact and the spacing between the first curved parts and the second curved parts can be alternately made along the circumferential direction.

(12) In order to achieve the second aspect, in the item (1), the spring may be configured as a coil spring, and one side of the coil spring may be in contact with the one axial side surface of the outer ring, and another side of the coil spring may be in contact with the one axial side surface of the cylinder. According to this, the coil spring and the cylinder can be continuously disposed along the axial direction, thereby contributing to reduction of size and weight of the fan motor.

(13) In the item (1), the plurality of bearings may be disposed between the impeller and the rotor. According to this, the plurality of bearings can constitute a center bearing supporting structure so as to be accommodated in a single housing.

(14) In the item (1), the fan motor may further include: a housing in which the impeller and the rotating shaft are accommodated; a vane hub accommodated inside the housing; a plurality of vanes formed to protrude from an outer circumferential surface of the vane hub to an inner circumferential surface of the housing and coupled to the housing; and a bearing housing accommodated inside the vane hub and accommodating the plurality of bearings, the spring, and the cylinder. According to this, since the plurality of bearings, the spring, and the cylinder are accommodated in the single bearing housing, the structure can be simplified. Since a separate cartridge is not required, the fan motor can be greatly reduced in size.

(15) In the item (14), the fan motor may further include a plurality of bridges extending between an inner circumferential surface of the vane hub and an outer circumferential surface of the bearing housing to connect the vane hub and the bearing housing. According to this, the plurality of bridges can connect the vane hub and the bearing housing with a simple structure.

(16) In the item (15), the bearing housing may further include a stopper protruding radially inward from one axial end portion thereof facing an opposite direction to the impeller to restrict an axial movement of the outer ring, and the outer ring may be disposed to be in contact with the stopper, and the inner ring may be spaced apart from the stopper in the axial direction. According to this, the stopper can restrict an excessive axial movement of the outer ring, thereby stabilizing a preload application to the ball bearing.

(17) In the item (15), the impeller may include: a hub accommodated inside the housing and having an accommodation space defined therein; and a plurality of blades protruding from an outer circumferential surface of the hub toward an inner circumferential surface of the housing, and a portion of the bearing housing may be accommodated in the accommodation space of the hub. According to this, since the hub covers a portion of the bearing housing that is open in the axial direction, an introduction of foreign substances into the bearing can be suppressed.

(18) A fan motor according to another embodiment of the present disclosure may include: a rotating shaft; an impeller mounted on one end portion of the rotating shaft; a motor unit mounted on another end portion of the rotating shaft; a plurality of bearings disposed between the impeller and the motor unit to support the rotating shaft; a spring disposed between the plurality of bearings, and brought into contact with one axial side surface of one of the plurality of bearings to elastically press the one axial side surface of the one bearing in an axial direction; and a cylinder disposed between the spring and the plurality of bearings, and having one axial end in contact with the spring and another axial end in contact with one axial side surface of another one of the plurality of bearings.

(19) A fan motor according to still another embodiment of the present disclosure may include: a rotating shaft; an impeller mounted on one end portion of the rotating shaft; a motor unit mounted on another end portion of the rotating shaft; a first bearing disposed adjacent to the impeller; a second bearing disposed adjacent to the motor unit; a spring in contact with one axial side surface of the first bearing, to elastically press the one axial side surface of the first bearing in an axial direction; and a cylinder disposed between the spring and the second bearing, to transfer elastic pressing force of the spring to the second bearing through contact.

(20) A fan motor according to still another embodiment of the present disclosure may include: a rotating shaft; an impeller mounted on one end portion of the rotating shaft; a motor unit mounted on another end portion of the rotating shaft; a first bearing disposed adjacent to the impeller; a second bearing disposed adjacent to the motor unit; a spring in contact with one axial side surface of the second bearing, to elastically press the one axial side surface of the second bearing in the axial direction; and a cylinder disposed between the spring and the first bearing, to transfer elastic pressing force of the spring to the first bearing through contact.

According to embodiments of the present disclosure, the following effects can be provided.

First, a plurality of bearings are disposed between an impeller and a motor unit. A spring and a cylinder are disposed between the plurality of bearings. A first bearing is disposed adjacent to the impeller. A second bearing is disposed adjacent to the motor unit. A sum of an axial length of the spring and a length of a cylinder is greater than an axial spacing between an inner ring of the first bearing and an inner ring of the second bearing. One axial side of the spring contacts an outer ring of the first bearing. The spring applies elastic pressing force (preload) to the outer ring of the first bearing in a first axial direction toward the impeller. Another axial side of the spring and one axial side of the cylinder are in contact with each other in the axial direction. Another axial side of the cylinder is in contact with the outer ring of the second bearing. The cylinder applies the elastic pressing force received from the spring in a second axial direction opposite to the first axial direction. The spring may elastically press the outer ring of the first bearing in the first axial direction and elastically press the outer ring of the second bearing in the second axial direction. Balls of the first and second bearings roll in contact at two points between a first bearing accommodating groove of the outer ring and a second bearing accommodating groove of the inner ring each having an arcuate curved surface. A virtual straight line, which passes in a radial direction of the ball through the two contact points between the ball and the outer ring and the inner ring is inclined with respect to the axial direction. The spring can elastically press the ball in axial and radial directions at the contact point between the outer ring and the ball. This can minimize that the ball minutely moves to one side in the axial direction or/and radial direction between the first bearing accommodating groove of the outer ring and the second bearing accommodating groove of the inner ring. This can also minimize an occurrence of wear due to friction between the outer ring and the inner ring and the ball.

Second, since the spring and the cylinder elastically press the outer ring of the bearing, a preload dispersion according to a press-fit depth of the ball bearing is very small.

Third, since the spring and the cylinder elastically press the outer rings of the respective first and second bearings in the axial direction, an amount of preload less changes due to thermal deformation of the rotating shaft and bearings during high-speed operation of the fan motor, thereby easily securing reliability of the ball bearing.

Fourth, since the cylinder has a spring mounting part to which the spring is mounted, a separate housing such as a sleeve surrounding a ball bearing, a coil spring, etc. is unnecessary, which simplifies a structure, reduces the number of components, and facilitate an assembly operation.

Fifth, the spring and the cylinder are directly assembled to a bearing housing of a vane hub, which is advantageous in reducing size and weight of a fan motor.

Sixth, an axial length of the spring is shorter than a diameter of the spring. The axial length of the spring is shorter than a length of the cylinder. The cylinder is rigid.

According to this, the structure of the spring can be simplified. A material cost of the spring can be reduced. The spring may be formed of a metal material. Since the axial length of the spring is shortened, a weight of the spring can be reduced.

In addition, the spring has a structure that is surface-contactable and has a length shorter than a diameter, and does not require a separate cartridge such as a sleeve for fixing the spring.

DETAILED DESCRIPTION

Hereinafter, a fan motor according to an embodiment of the present disclosure will be described in detail with reference to the accompanying drawings.

In the following description, in order to clarify the characteristics of the present disclosure, descriptions of some components may be omitted.

1. Definition of Terms

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation used herein may include a plural representation unless it represents a definitely different meaning from the context.

The term "fan motor" used in the following description may be understood as a concept meaning a device that suctions or blows air by rotating a fan using power of an electric motor or the like.

The term "dispersion" used in the description herein means uneven magnitudes of measurements.

The term "preload" used in the description herein means applying pressure or load in advance. It can be understood that the fan motor applies force to a bearing before starting operation.

The term "axial direction" used in the following description means a longitudinal direction of the rotating shaft.

The term "radial direction" used in the following description means a longitudinal direction of a line segment from a center of a circle or cylinder to a point on a circumference.

The term "circumferential direction" used in the following description means a direction of a circumference of a circle.

The terms "upper side," "lower side," "right side," "left side," "front side," and "rear side" used in the following description will be understood through the coordinate system shown in FIGS. 4, 6, and 9.

The term "axial direction" used in the following description may be understood as a concept corresponding to a vertical or up-down direction.

The term "radial direction" used in the following description may be understood as a concept corresponding to a left-right direction or a forward-backward direction.

2. Description of Configuration of Fan Motor According to One Embodiment

Figure 1:
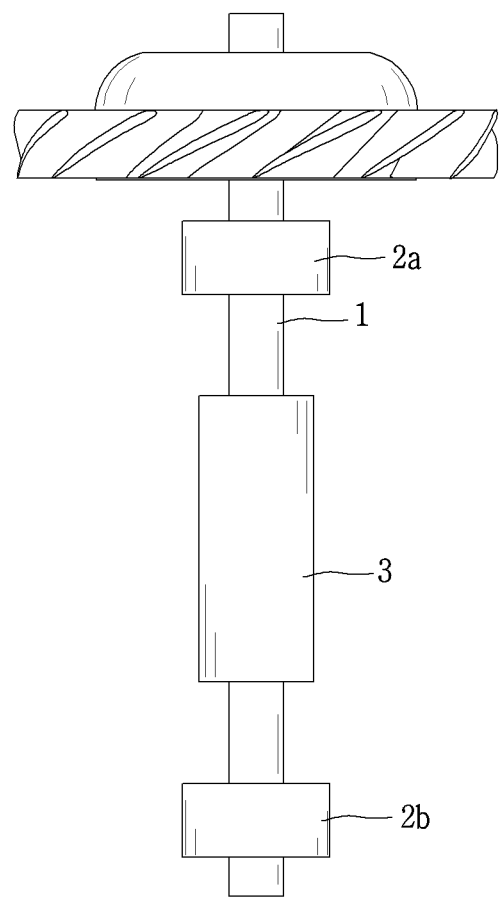
FIG. 1 is a conceptual view illustrating a both-side bearing supporting structure.
Figure 2:
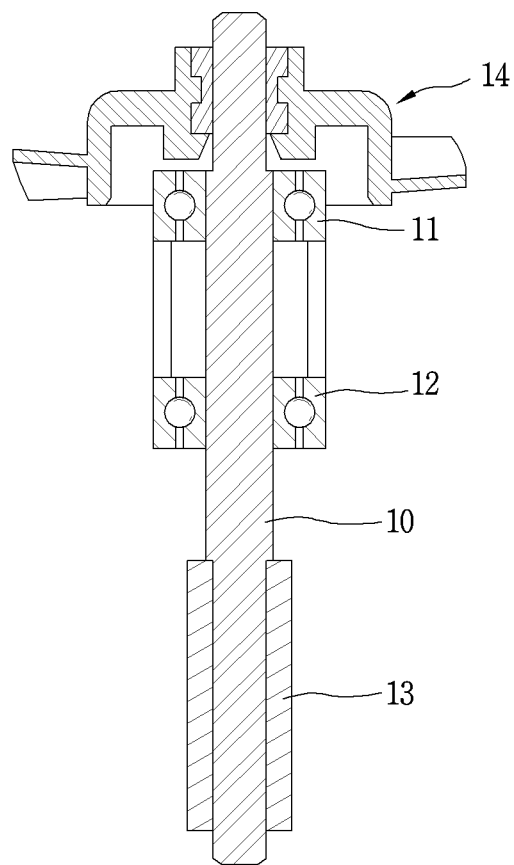
FIG. 2 is a conceptual view illustrating a center bearing supporting structure.
Figure 3:
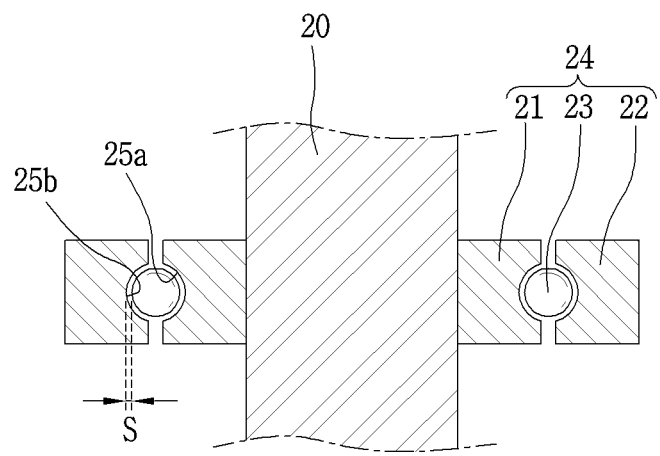
FIG. 3 is a conceptual view for explaining a problem of a ball bearing mounted on a rotating shaft.
Figure 4:
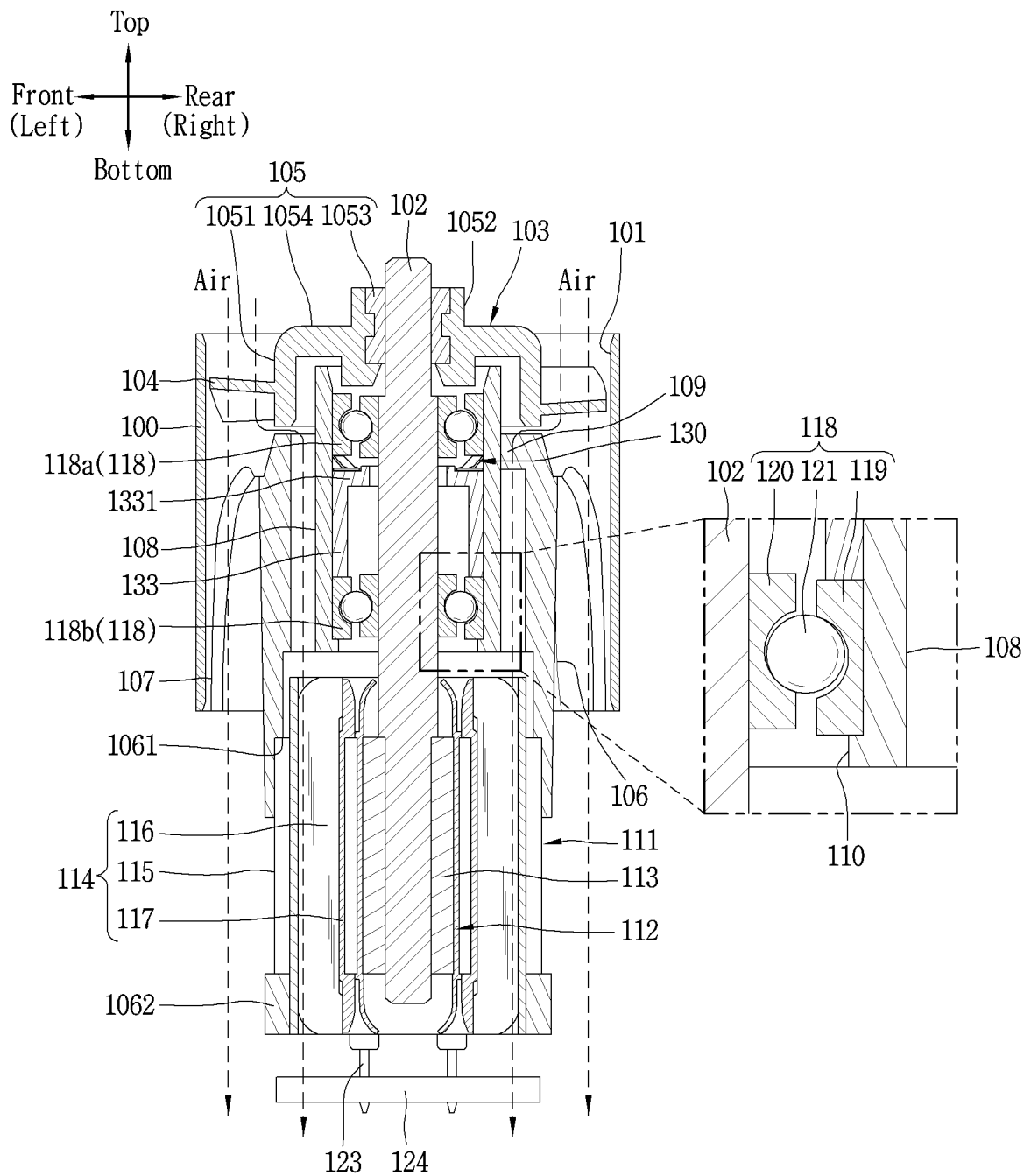
FIG. 4 is a cross-sectional view illustrating an internal configuration of a fan motor in accordance with the present disclosure.

FIG. 4 is a cross-sectional view illustrating an internal configuration of a fan motor in accordance with the present disclosure.

Figure 5:
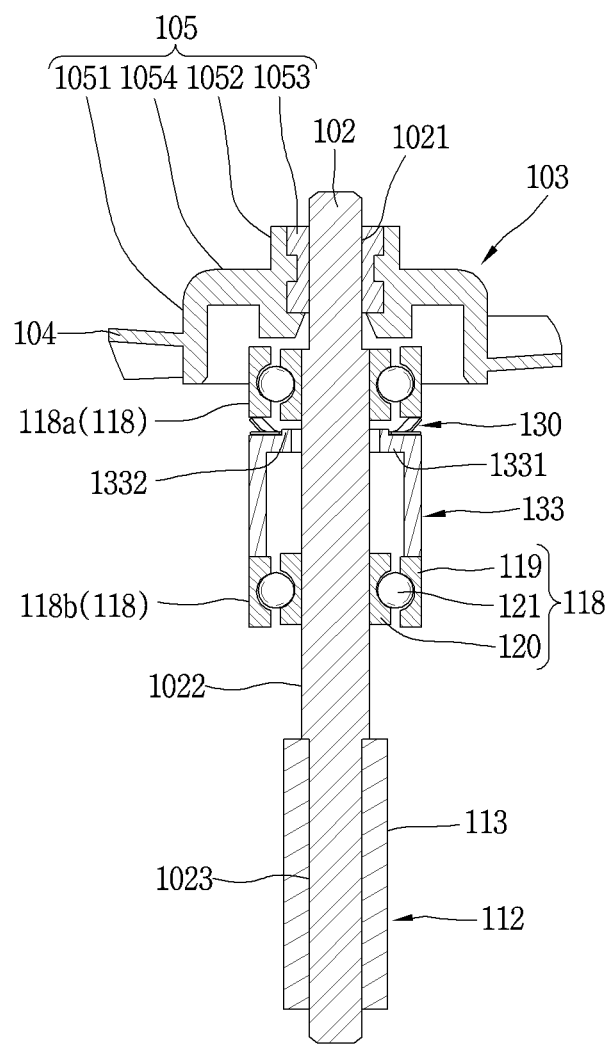
FIG. 5 is a conceptual view illustrating a rotor assembly having a preload applying structure of a bearing in FIG. 4.

FIG. 5 is a conceptual view illustrating a rotor assembly having a preload applying structure of a bearing 118 in FIG. 4.

Figure 6:
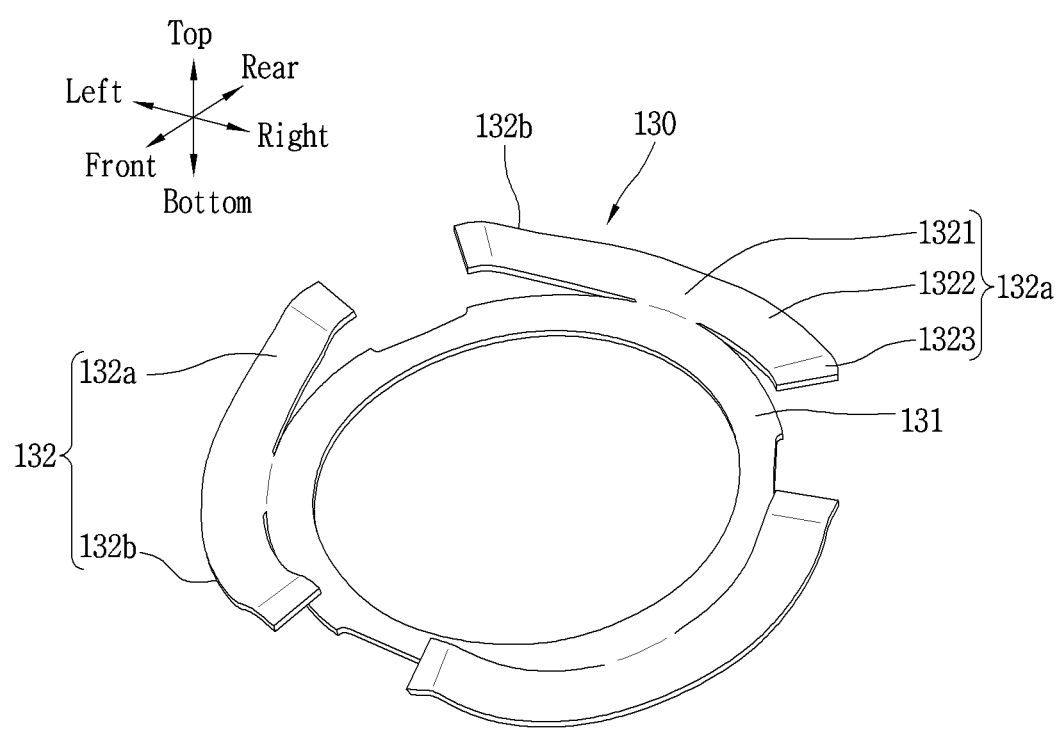
FIG. 6 is a perspective view illustrating one example of a spring in FIG. 4.

FIG. 6 is a perspective view illustrating one example of a spring 130 in FIG. 4.

Figure 7:
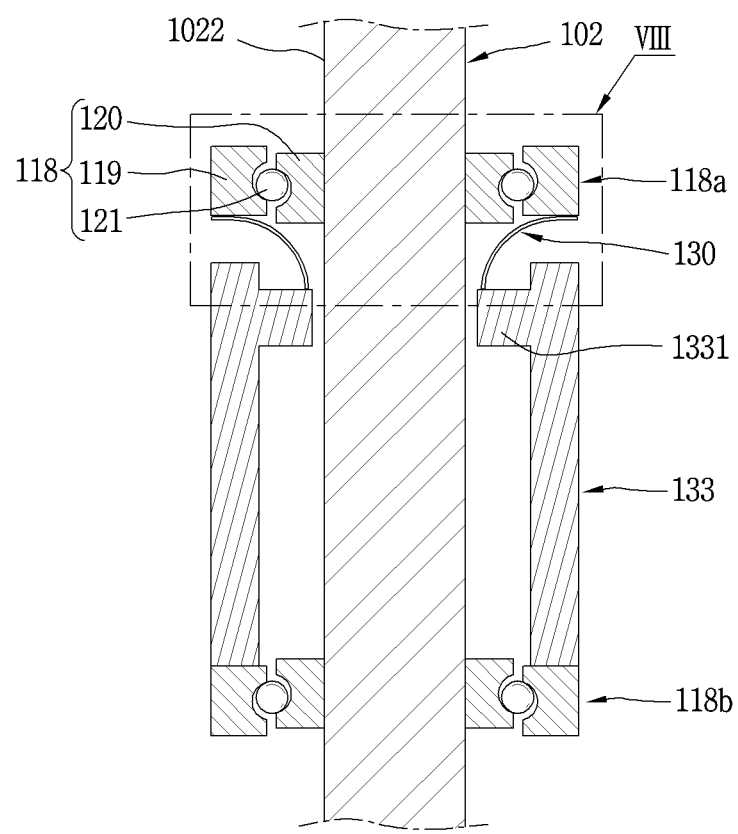
FIG. 7 is a conceptual view illustrating a state in which a spring of FIG. 5 applies a preload to a bearing.

FIG. 7 is a conceptual view illustrating a state in which the spring 130 of FIG. 5 applies a preload to the bearing 118.

Figure 8:
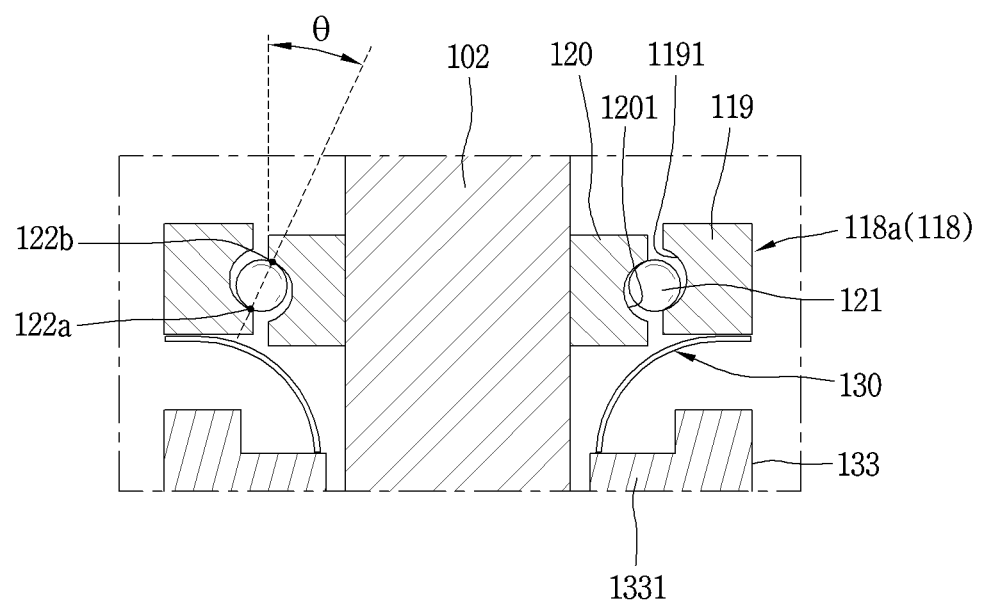
FIG. 8 is an enlarged view of an area VIII of FIG. 7.

FIG. 8 is an enlarged view of an area VIII of FIG. 7.

A fan motor according to the present disclosure may be applied to home appliances such as a handy-stick cleaners and the like.

The fan motor may include a housing 100, a rotating shaft 102, an impeller 103, a vane 107, a motor unit 111, and a bearing assembly.

The housing 100 may define appearance of the fan motor. The housing 100 may be formed in a hollow cylindrical shape. The housing 100 may be formed to have constant diameter and thickness in an axial direction. The housing 100 may be formed in an integral shape. The housing 100 may be formed of a plastic material.

The housing 100 has an accommodation space in which the impeller 103 and the vane are accommodated. Movement paths of air generated by the impeller 103 may be formed between the housing 100 and the impeller 103 and between the housing 100 and a vane hub 106 to be described later.

An inlet port 101 is located at an upstream end portion of the first housing 100 based on an air flowing direction. The inlet port 101 may be formed through an upper end of the housing 100. Accordingly, air generated by the impeller 103 is suctioned through the inlet port 101.

The rotating shaft 102 is disposed in a center of the housing 100. The rotating shaft 102 extends along the axial direction passing through the center of the housing 100.

The rotating shaft 102 is accommodated inside the housing 100. The impeller 103 is rotatably mounted on one end portion of the rotating shaft 102.

The impeller 103 includes a hub 105 and a plurality of blades 104.

The hub 105 may include a hub body 1051, a shaft coupling part 1052, and a cover part 1054.

The hub body 1051 may be formed in a cylindrical shape having a constant diameter along the axial direction. The shaft coupling part 1052 is disposed inside the hub body 1051.

An accommodation space is defined inside the hub body 1051. The shaft coupling part is disposed inside the hub body 1051. The shaft coupling part 1052 surrounds one end portion of the rotating shaft 102. A shaft coupling hole is formed through the inside of the shaft coupling part 1052 in the axial direction.

The cover part 1054 extends radially between an upper side of the hub body 1051 and an outer circumferential surface of the shaft coupling part 1052 to connect the upper side of the hub body 1051 and the outer circumferential surface of the shaft coupling part 1052. The cover part covers the upper side of the hub body 1051.

The cover part 1054 extends from the upper side of the hub body 1051 in a circumferential direction.

The shaft coupling part 1052 may include a first shaft coupling portion protruding outwardly along the axial direction from an upper surface of the cover part 1054 and a second shaft coupling portion protruding inwardly along the axial direction from a lower surface of the cover part 1054.

The hub 105 may be formed of a plastic material. The shaft coupling part 1052 may be press-fitted to the rotating shaft 102. The rotating shaft 102 and the hub 105 may be made of different materials having different heat transfer coefficients. The rotating shaft 102 may be made of a metal material to secure rigidity.

For press-fitting the shaft coupling part 1052, a press-fit pin 1053 may be disposed inside the shaft coupling part 1052. The press-fit pin 1053 may be formed of the same material as the rotating shaft 102. The press-fit pin 1053 may be press-fitted to the rotating shaft 102 by interference fit.

A shaft through hole is formed through the inside of the press-fit pin 1053 in the axial direction such that one end portion of the rotating shaft 102 is inserted through a central portion of the hub 105.

Each of the plurality of blades 104 may spirally extend along an outer circumferential surface of the hub 105.

The plurality of blades 104 are spaced apart from one another at preset intervals along a circumferential direction of the hub 105.

With the configuration, the impeller 103 can rotate together with the rotating shaft 102. As the plurality of blades 104 rotate at high speed together with the hub 105, air moves in an inner space of the housing 100 and thereby external air can be suctioned.

The vane 107 is disposed on an outer circumferential surface of the vane hub 106.

The vane hub 106 may be formed in a cylindrical shape with a constant diameter. The vane hub 106 may have a diameter which is equal to or longer than a diameter of the hub 105. A length of the vane hub 106 may be shorter than the diameter of the vane hub 106.

The vane 107 may be provided in plurality. The plurality of vanes 107 are disposed on the outer circumferential surface of the vane hub 106 to be spaced apart from one another in the circumferential direction. The plurality of vanes 107 protrude radially outward from the outer circumferential surface of the vane hub 106.

The plurality of vanes 107 extend along a longitudinal direction of the vane hub 106. A length of the vane 107 may be shorter than a length of the vane hub 106.

The vanes 107 are configured to switch the air flowing direction from the radial direction to the axial direction. Accordingly, air generated by the impeller 103 can be guided by the vanes 107 to flow in the axial direction.

The vanes 107 may be press-fitted to an inner circumferential surface of the housing 100. The vanes 107 are made to connect the housing 100 and the vane hub 106.

A bearing housing 108 is disposed inside the vane hub 106. The bearing housing 108 may be spaced apart radially from the inner circumferential surface of the vane hub 106. The vane hub 106 and the bearing housing 108 may be spaced different distances apart from the rotating shaft 102 in the radial direction.

The bearing housing 108 may be formed in a cylindrical shape with a constant diameter along the axial direction. The diameter of the bearing housing 108 is smaller than the diameter of the vane hub 106. The bearing housing 108 has an accommodation space therein to accommodate the bearing assembly.

A length of the bearing housing 108 may be shorter than or equal to the length of the vane hub 106. In the embodiment of the present disclosure, an example in which the length of the bearing housing 108 is shorter than the length of the vane hub 106 is illustrated.

A portion of the bearing housing 108 may protrude more than an upstream end portion of the vane hub 106 based on the air flowing direction. Referring to FIG. 4, an upper portion of the bearing housing 108 may be located higher than an upper end of the vane hub 106.

The upper portion of the bearing housing 108 protruding axially from the vane hub 106 may be accommodated inside the hub 105. The upper portion of the bearing housing 108 may be disposed to surround the second shaft coupling portion.

A first gap is defined between the hub 105 and the bearing housing 108, and air can flow through the first gap. In addition, a second gap is defined between the bearing housing 108 and the second shaft coupling portion, and air can flow through the second gap. According to this, the first gap and the second gap can define flow paths, through which air can move to the bearing 118, to be described later.

A bridge 109 may be disposed between the vane hub 106 and the bearing housing 108. The bridge 109 extends in the radial direction between the vane hub 106 and the bearing housing 108. An outer end portion of the bridge 109 may be connected to an inner circumferential surface of the vane hub 106, and an inner end portion of the bridge 109 may be connected to an outer circumferential surface of the bearing housing 108. The bridge 109 may extend from an upper end portion of the vane hub 106 to the outer circumferential surface of the bearing housing 108.

The bridge 109 may be provided in plurality. The plurality of bridges 109 may be disposed to be spaced apart from each other in the circumferential direction. An inlet may be defined between the plurality of bridges 109 adjacent to each other in the circumferential direction.

An outer flow path may be defined between the housing 100 and the vane hub 106. An inner flow path may be defined between the vane hub 106 and the bearing housing 108. A lower end of the hub 105 and an upper end of the vane hub 106 are spaced apart from each other in the axial direction. Such spacing may allow the outer flow path and the inner flow path to communicate with each other.

Air generated by the impeller 103 may move in the axial direction through the outer flow path. The air may move from the outer flow path to the inner flow path through the spacing. The air flowing in the axial direction through the inner flow path may move to the motor unit 111.

According to this, the air flowing along the outer flow path can form an air flow in a cleaner or the like. Air branched from the outer flow path to the inner flow path may be discharged to the outside after cooling the motor unit 111 and may join the air flow.

The rotating shaft 102 is disposed inside the housing 100 to be rotatable relative to the housing 100.

The motor unit 111 receives electrical energy to rotate the rotating shaft 102 and rotates the impeller 103 mounted on one end portion of the rotating shaft 102.

To this end, the motor unit 111 includes a rotor 112 and a stator 114.

The rotor 112 includes a permanent magnet 113.

The permanent magnet 113 is formed in a cylindrical shape. A shaft through hole is formed through a central portion of the permanent magnet 113. The shaft through hole is formed through the permanent magnet 113 in the axial direction.

The permanent magnet 113 is mounted on the rotating shaft 102. A rotor support part is disposed on the rotating shaft 102. The permanent magnet 113 may be press-fitted to the rotor support part 1023.

The rotating shaft 102 may include an impeller support part 1021, a bearing support part 1022, and a rotor support part 1023. The impeller support part 1021, the bearing support part 1022, and the rotor support part 1023 may be arranged in an order from an upstream side to a downstream side of the rotating shaft 102 based on the air flowing direction.

A diameter of the bearing support part 1022 may be larger than a diameter of the impeller support part 1021. A diameter of the rotor support part 1023 may be smaller than the diameter of the bearing support part 1022.

A first stepped jaw may be formed due to the difference of the diameters between the impeller support part 1021 and the bearing support part 1022. A second stepped jaw may be formed due to the difference of the diameters between the bearing support part 1022 and the rotor support part 1023, to restrict the permanent magnet 113 from moving toward the bearing support part 1022 in the axial direction.

The permanent magnet 113 may be mounted on a rotor core (not shown) or on the rotating shaft 102. In the embodiment of the present disclosure, the permanent magnet 113 is shown mounted on the rotating shaft 102.

The stator 114 includes a stator core 115 and coils 116.

The stator core 115 may be formed by stacking thin electrical steel sheets in the axial direction. The stator core 115 is formed in a cylindrical shape. A rotor through hole is formed through a central portion of the stator core 115. The rotor through hole is formed through the stator core 115 in the axial direction.

A diameter of the rotor through-hole is slightly larger than the diameter of the permanent magnet 113. The permanent magnet 113 may maintain a preset distance (air gap) from an inner circumferential surface of the stator core 115.

The stator core 115 includes a back yoke, a plurality of slots, and a plurality of teeth.

The back yoke is formed in a cylindrical shape.

The plurality of teeth are formed to protrude from the back yoke toward the rotating shaft 102 in the radial direction. Pole shoes may protrude in the circumferential direction from inner end portions of the plurality of teeth.

The plurality of slots are formed to penetrate through the stator core 115 in the axial direction. The plurality of teeth and the plurality of slots each are alternately arranged in a spaced manner in the circumferential direction of the stator core 115. This embodiment illustrates three teeth and three slots.

The plurality of teeth and the plurality of slots each may be spaced apart from one another at intervals of 120 degrees in the circumferential direction.

The plurality of coils 116 are wound on the stator core 115 through the plurality of slots, respectively. In this embodiment, three coils 116 are illustrated. Three-phase AC currents may be applied to the three coils 116.

The stator 114 is provided with a plurality of terminals 123 so that external three-phase AC power is supplied to the coils 116. In the embodiment of the present disclosure, three terminals 123 may be provided one by one for each phase.

The terminals 123 electrically connect external three-phase AC power source and the coils 116. The terminals 123 may extend downward from the coils 116 in the axial direction.

The plurality of terminals 123 may be coupled to a connection ring 124. The connection ring 124 facilitates the connection between the terminals 123 and the external power source.

A first seating part 1061 and a second seating part 1062 are disposed inside the vane hub 106. The stator core 115 is seated on the first seating part 1061 and the second seating part 1062. The first seating part 1061 and the second seating part 1062 may be stepped from each other in the radial direction.

An upper side of the stator core 115 may be seated on the first seating part 1061. A lower side of the stator core 115 may be seated on the second seating part 1062.

Upper sides of the plurality of coils 116 may be accommodated inside the first seating part 1061. Lower sides of the plurality of coils 116 may be accommodated inside the second seating part 1062.

A flow path may be defined between the plurality of coils 116 such that air can flow. Air may pass through the motor unit 111 along the flow path and can cool heat generated in the motor unit 111.

Insulators 117 are disposed for electrical insulation between the coils 116 and the stator core 115. The insulators 117 may be made of a non-conductor.

The insulators 117 may be disposed between the coils 116 and the stator core 115 to block current from flowing between the coils 116 and the stator core 115.

The plurality of coils 116 and the plurality of insulators 117 each may be spaced apart from one another at intervals of 120 degrees along the circumferential direction of the stator core 115.

The bearing assembly is disposed to rotatably support the rotating shaft 102.

The bearing assembly may include a first bearing 118a, a second bearing 118b, a spring 130, and a cylinder 133.

The bearing assembly may be disposed between the impeller 103 and the motor unit 111. The impeller 103 may be disposed at an upstream side of the housing 100 based on the air flowing direction. The motor unit 111 is disposed at a downstream side of the housing 100 based on the air flowing direction.

The bearing assembly may be accommodated inside the bearing housing 108.

The first bearing 118a and the second bearing 118b are mounted on the rotating shaft 102. The first bearing 118a and the second bearing 118b may be mounted on the bearing support part 1022. The first bearing 118a and the second bearing 118b may construct a center bearing support structure.

The first bearing 118a is mounted on an upstream side of the bearing support part 1022 based on the air flowing direction. The first bearing 118a may be disposed adjacent to the impeller 103. A portion of the first bearing 118a may be disposed inside the hub 105.

The second bearing 118b is mounted on a downstream side of the bearing support part based on the air flowing direction. The second bearing 118b may be disposed adjacent to the motor unit 111. The second bearing 118b may be spaced apart from the first bearing 118a in the axial direction.

The following description of the bearing 118 may be applied to each of the first bearing 118a and the second bearing 118b, unless otherwise specified.

The bearing 118 may be implemented as a ball bearing 118. The ball bearing 118 is provided to support a radial load of the rotating shaft 102. The bearing 118 may include an outer ring 119, an inner ring 120, a plurality of balls 121, and a plurality of covers (not shown).

The outer ring 119 is formed in a cylindrical shape. The bearing housing 108 may be formed to enclose the outer ring 119. The bearing housing 108 surrounds the outer ring 119. According to this, the bearing housing 108 can restrict the outer ring 119 from moving radially outward. However, the bearing housing 108 may allow axial movement of the outer ring 119.

The inner ring 120 is formed in a cylindrical shape. The inner ring 120 is disposed inside the outer ring 119 with a gap from the outer ring 119. The inner ring 120 is formed to surround the bearing support part.

The inner ring 120 encloses the rotating shaft 102. The inner ring 120 may be press-fitted to the rotating shaft 102. The inner ring 120 rotates together with the rotating shaft 102. However, the inner ring 120 is restricted from moving in the axial direction along the rotating shaft 102.

The gap between the outer ring 119 and the inner ring 120 is narrower than a diameter of the ball 121 to be described later.

The plurality of balls 121 are disposed between the outer ring 119 and the inner ring 120. The plurality of balls 121 are spaced apart at preset intervals in the circumferential direction of the outer ring 119 and the inner ring 120.

A first bearing accommodating groove 1191 is formed concavely in an arcuate curved shape on an inner circumferential surface of the outer ring 119. A second bearing accommodating groove 1201 is formed concavely in an arcuate curved shape on an outer circumferential surface of the inner ring 119.

The plurality of balls 121 are rollable in contact between the first bearing accommodating groove 1191 of the outer ring 119 and the second bearing accommodating groove 1201 of the inner ring 120. The inner ring 120 performs rotational motion relative to the outer ring 119 by the balls 121.

The plurality of covers are coupled to cover both sides of the outer ring and the inner ring in the axial direction, respectively.

The spring 130 may be disposed between the first bearing 118a and the second bearing 118b. The cylinder 133 may be disposed between the first bearing 118a and the second bearing 118b.

The spring 133 and the cylinder 133 may be disposed between the first bearing 118a and the second bearing 118b.

The spring 130 and the cylinder 133 may be disposed in series between the first bearing 118a and the second bearing 118b. Here, being disposed in series may be interpreted as meaning that the spring 130 and the cylinder 133 are disposed in a straight line.

The spring 133 and the cylinder 133 may be connected in series between the first bearing 118a and the second bearing 118b. Here, being connected in series may be interpreted as meaning that one end of the spring 130 and one end of the cylinder 133 face each other in the axial direction and are connected through a physical contact.

The spring 130 may be disposed on one side of the first bearing 118a or the second bearing 118b. In this embodiment, the spring 130 is disposed on one side of the first bearing 118a.

The spring 130 may be accommodated inside the bearing housing 108.

The spring 130 may be made of an elastically deformable material. For example, the spring 130 may be formed of a metal material. The spring 130 is configured to elastically press the bearing 118 in the axial direction.

The spring 130 may be disposed between the first bearing 118a and the cylinder 133.

One side of the spring 130 is disposed to be in contact with one axial side surface of the first bearing 118a. Another side of the spring 130 may be disposed in contact with one axial side surface of the cylinder 133.

The cylinder 133 may be formed in a cylindrical shape. The cylinder 133 may formed to have a constant diameter along the axial direction. The diameter of the cylinder 133 may be equal to or smaller than the diameter of the bearing 118. Here, the diameter of the cylinder 133 means an outer diameter of the cylinder 133.

A hollow portion may be formed through an inside of the cylinder 133 in the axial direction. The rotating shaft 102 may be inserted through the inside of the cylinder 133 in the axial direction.

The cylinder 133 may be disposed on one side of the second bearing 118b or the first bearing 118a. In this embodiment, the cylinder 133 is disposed on the one side of the second bearing 118b.

The cylinder 133 may be disposed between the spring 130 and the second bearing 118b.

One axial side of the cylinder 133 may be disposed in contact with another side of the spring 130. Another axial side of the cylinder 133 may be disposed in contact with one axial side surface of the second bearing 118b.

The spring 130 may be mounted on the one axial side of the cylinder 133. A spring mounting part 1331 may be formed on the one axial side of the cylinder 133. The spring mounting part 1331 may protrude radially from an outer or inner circumferential surface of the cylinder 133. In this embodiment, the spring mounting part 1331 protrudes radially inward from the inner circumferential surface of the cylinder 133.

The spring mounting part 1331 may extend along the circumferential direction or may be provided in plurality to be spaced apart from each other in the circumferential direction of the cylinder 133.

An inner end portion of the spring mounting part 1331 may be spaced apart from the outer circumferential surface of the rotating shaft 102 by a preset interval.

A stopper 110 may be disposed on another axial side of the bearing housing 108. The another axial side of the bearing housing 108 is a side facing an opposite direction to the impeller 103.

The stopper 110 may protrude radially inward from the inner circumferential surface of the bearing housing 108. According to this, the stopper 110 can restrict the bearing assembly from moving in the axial direction opposite to the impeller 103.

The stopper 110 is configured to come into contact with one axial side surface of the outer ring 119 of the second bearing 118b. However, the stopper 110 and the inner ring 120 of the bearing 118 may be spaced apart from each other with a gap therebetween in the axial direction.

Here, the gap between the stopper 110 and the inner ring 120 of the bearing 118 is a space in which the outer ring 119 of the bearing 118 is movable in the axial direction such that the spring 130 and the cylinder 133 can apply a preload to the outer ring 119 of the bearing 118 in the axial direction, which will be described later.

The spring 130 may be formed in a plate shape having a predetermined thickness.

The spring 130 may include a ring portion 131 and arm portions 132.

The ring portion 131 may be formed in a circular shape. The ring portion 131 may be formed in a closed loop shape. The ring portion 131 may include upper and lower surfaces facing opposite sides to each other in the axial direction, and a side surface having a thickness between the upper and lower surfaces. The thickness of the ring portion 131 is much thinner than an axial length of the bearing 118.

The upper and lower surfaces of the ring portion 131 may be flat surfaces. The side surface of the ring portion 131 may be formed in a circular curved shape.

A hollow hole may be formed through an inside of the ring portion 131 such that the rotating shaft 102 is inserted therethrough.

A diameter of the ring portion 131 may be larger than the diameter of the rotating shaft 102.

A fixing protrusion 1332 may protrude upward from an inner end portion of the spring mounting part 1331 toward the first bearing 118a. The ring portion 131 may be press-fitted to the fixing protrusion to enclose the fixing protrusion.

The arm portion 132 may include a first arm portion 132a and a second arm portion 132b forming a pair.

The first arm portion 132a and the second arm portion 132b forming the pair may be provided in plurality to form plural pairs along the ring portion 131 in the circumferential direction. The plural pairs of arm portions 132 may be spaced apart at intervals in the circumferential direction. In this embodiment, three pair of arm portions 132 are illustrated.

The three pairs of arm portions 132 may be spaced apart from one another by intervals of 120 degrees.

The first arm portion 132a and the second arm portion 132b may extend in the circumferential direction. Each of the first arm portion 132a and the second arm portion 132b may be formed in a curved shape at a preset curvature.

The first arm portion 132a and the second arm portion 132b may be disposed on an outer side the ring portion 131.

One side of each of the first arm portion 132a and the second arm portion 132b may be integrally connected in the circumferential direction. One side of each of the first arm portion 132a and the second arm portion 132b may be integrally connected to one side of an outer circumferential surface of the ring portion 131.

Another side of each of the first arm portion 132a and the second arm portion 132b may extend to opposite sides along the circumferential direction. The another side of each of the first arm portion 132a and the second arm portion 132b may be spaced apart from the ring portion in the axial direction.

The one side of each of the first arm portion 132a and the second arm portion 132b may be located at the same height as the ring portion 131 in the axial direction. The another side of each of the first arm portion 132a and the second arm portion 132b may be disposed higher in the axial direction than the one side of each of the first arm portion 132a and the second arm portion 132b.

The another side of each of the first arm portion 132a and the second arm portion 132b may be located at the same height from the ring portion 131 in the axial direction.

The another side of each of the first arm portion 132a and the second arm portion 132b may be a free end.

Of the two pairs of arm portions 132 adjacent to each other in the circumferential direction, the another side of the first arm portion 132a and the another side of the second arm portion 132b may be spaced apart from each other in the circumferential direction.

The following description of the arm portion 132 may be equally applied to each of the first arm portion 132a and the second arm portion 132b, unless otherwise specified.

The arm portion 132 includes a connecting part 1321, an inclined part 1322, and a contact part 1323. The connecting part 1321 is disposed on the one side of the arm portion 132. The connecting part 1321 connects the arm portion 132 and the ring portion 131. The connecting part 131 may be located to be flush with the ring portion 131.

The inclined part 1322 may extend from the ring portion 131 to be inclined toward the bearing 118. The inclined part 1322 connects the connecting part 1321 and the contact part 1323.

The contact part 1323 is disposed on the another side of the arm portion 132. The contact part 1323 is disposed to be in surface-contact with one axial side surface of the bearing 118. In particular, the contact part 1323 may come into contact with the outer ring 119 of the bearing 118.

The contact part 1323 is disposed to be spaced apart from the ring portion 131. The contact part 1323 is a free end. The contact part 1323 is rotatable or movable in the axial direction around the connecting part 1321.

The arm portion 132 may be elastically deformable in the axial direction.

A diameter of each of the plural pairs of arm portions 132 is larger than a diameter of the ring portion 131. The diameter of the arm portion 132 is larger than a height of the arm portion in the axial direction. An axial length of the spring 130 is smaller than the diameter of the spring 130.

A diameter of the arm portion 132 may correspond to the diameter of the cylinder 133. Here, "corresponding" may be understood as a concept that the diameter of the arm portion 132 and the diameter of the cylinder 133 are the same as or similar to each other.

The axial height of the arm portion 132 spaced apart from the ring portion 131 is smaller than the length of the cylinder 133. The axial length of the spring 130 is smaller than the length of the cylinder 130.

Of two pairs of arm portions 132 adjacent to each other in the circumferential direction, the first contact part 1323 of the first arm portion 132a of any one pair may be spaced apart from the second contact part 1323 of the second arm portion 132b of another pair in the circumferential direction of the ring portion 131.

The spring 130 may be in contact with the one axial side surface of the outer ring 119 of the first bearing 118a through the contact part 1323 of the arm portion 132.

The spring mounting part 1331 disposed on one end portion of the cylinder 133 is in contact with the ring portion 131 of the spring 130. Another end portion of the cylinder 133 may be in contact with the one side surface of the outer ring 119 of the second bearing 118b. Here, the one end portion and the another end portion of the cylinder 133 face opposite sides in the axial direction.

One axial side surface of the first bearing 118a in contact with the contact part 1323 of the spring 130 and one axial side surface of the second bearing 118b in contact with the cylinder face each other in the axial direction.

Hereinafter, a description will be given of an operation in which the spring 130 and the cylinder 133 apply a preload to the bearing 118 and effects thereof.

Before the spring 130 and the cylinder 133 are mounted between the first bearing 118a and the second bearing 118b, the sum of the axial length of the spring 130 and the axial length of the cylinder 133 is greater than an axial distance between the inner ring 120 of the first bearing 118a and the inner ring 120 of the second bearing 118b.

The length of the cylinder 133 may be smaller than an axial distance between the first bearing 118a and the second bearing 118b.

The spring 130 may be compressed by the first bearing 118a and the cylinder 133. The contact part 1323 of the arm portion 132 of the spring 130 is compressed by the outer ring 119 of the first bearing 118a. The ring portion 131 of the spring 130 is compressed by the cylinder 133.

According to this configuration, the spring 130 may store elastic pressing force through elastic deformation of the arm portion 132. The elastic pressing force of the spring 130 is a reaction with respect to compression force of the first bearing 118a and the cylinder 133.

The spring 130 applies the elastic pressing force to the outer ring 119 of the first bearing 118a in the axial direction through the contact part 1323 of the arm portion 132.

The spring 130 applies the elastic pressing force to the one axial side surface of the cylinder 133 in the axial direction through the ring portion 131.

The cylinder 133 may transfer the elastic pressing force received from the spring 130 to the outer ring 119 of the second bearing 118b.

The elastic pressing force applied through the contact part 1323 of the spring 130 and the elastic pressing force applied through the ring portion 131 of the spring 130 may act in opposite directions along the axial direction.

The contact part 1323 applies the elastic pressing force to the outer ring 119 of the first bearing 118a. The outer ring 119 of the first bearing 118a moves toward the impeller 103 in a first axial direction. A portion of the outer ring 119 of the first bearing 118a may protrude axially toward the impeller 103 more than one axial side surface of the inner ring 120 of the first bearing 118a.

The cylinder 133 transmits and applies the elastic pressing force received from the ring portion 131 to the outer ring 119 of the second bearing 118b. The outer ring 119 of the second bearing 118b moves toward the motor unit 111 in a second axial direction. The first axial direction and the second axial direction are opposite to each other. A portion of the outer ring 119 of the second bearing 118b may protrude axially toward the motor unit 111 more than one axial side surface of the inner ring 120 of the second bearing 118b.

Accordingly, the first bearing accommodating groove 1191 of the outer ring 119 of the bearing 118 is brought into point-contact with the ball 121. The second bearing accommodating groove 1201 of the inner ring 120 of the bearing 118 is brought into point-contact with the ball 121.

Two contact points 122a and 122b are spaced apart from the center of the ball 121 in the radial and axial directions.

Of the two contact points 122a and 122b, the first contact point 122a where the first bearing accommodating groove 1191 of the outer ring 119 and the ball 121 come into contact is disposed outside based on an axial center line that passes through a center of the ball 121 in the axial direction.

The first contact point 122a may be located at an axial end of the first bearing accommodating groove 1191. The first contact point 122a is spaced apart from the center of the ball 121 in an opposite direction to the impeller 103 based on a radial center line passing through the center of the ball 121 in the radial direction of the rotating shaft 102.

Of the two contact points 122a and 122b, the second contact point 122b where the second bearing accommodating groove 1201 of the inner ring 120 and the ball 121 come into contact is disposed inside based on the axial center line that passes through the center of the ball in the axial direction.

The second contact point 122b may be located at an axial end of the second bearing accommodating groove 1201. The second contact point 122b is spaced apart from the center of the ball 121 in a direction toward the impeller 103 based on a radial center line passing through the center of the ball 121 in the radial direction of the rotating shaft 102.

The ball 121 is rollably supported on two points between the outer ring 119 and the inner ring 120. A virtual radial center line that passes in the radial direction through the two contact points 122a and 122b between the ball 121 and the outer ring 119 and the inner ring 120 and the center of the ball 121 may be inclined at a preset angle with respect to the axial direction.

Therefore, according to the present disclosure, the plurality of bearings 118 are disposed between the impeller 103 and the motor unit 111. The spring 130 and a cylinder 133 are disposed between the plurality of bearings 118. The first bearing 118a is disposed adjacent to the impeller 103. The second bearing 118b is disposed adjacent to the motor unit 111. The sum of the axial length of the spring 130 and the length of the cylinder 133 is greater than a distance in the axial direction between the inner ring 120 of the first bearing 118a and the inner ring 120 of the second bearing 118b. One axial side of the spring 130 is in contact with the outer ring 119 of the first bearing 118a. The spring 130 applies elastic pressing force (preload) to the outer ring 119 of the first bearing 118a in a first axial direction toward the impeller 103. Another axial side of the spring 130 and one axial side of the cylinder 133 are in contact with each other in the axial direction. Another axial side of the cylinder 133 is in contact with the outer ring 119 of the second bearing 118b. The cylinder 133 applies the elastic pressing force received from the spring in a second axial direction opposite to the first axial direction. The spring 130 may elastically press the outer ring 119 of the first bearing 118a in the first axial direction and elastically press the outer ring 119 of the second bearing 118b in the second axial direction. The ball 121 of each of the first bearing 118a and the second bearing 118b is rolled in contact with two points between the first bearing accommodating groove 1191 of the outer ring 119 and the second bearing accommodating groove 1201 of the inner ring 120 each having the arcuate curved surface. An imaginary straight line which passes through the two contact points 122a and 122b of the outer ring 119 and the inner ring 120 in contact with the ball 121 in the radial direction of the ball 121, is inclined with respect to the axial direction. The spring 130 may elastically apply pressure to the ball 121 in the axial and radial directions at the contact point between the outer ring 119 and the ball 121. This can minimize that the ball 121 minutely moves to one side in the axial direction or/and radial direction between the first bearing accommodating groove 1191 of the outer ring 119 and the second bearing accommodating groove 1201 of the inner ring 120. This can also minimize an occurrence of wear due to friction between the outer ring 119 and the inner ring 120 and the ball 121.

In addition, since the outer ring 119 of the bearing 118 is elastically pressurized using the spring 130 and the cylinder 133, a preload dispersion according to a press-fit depth of the ball bearing is significantly reduced.

In addition, when a preload is applied to the bearing 118 using the spring 130 and the cylinder 133, the amount of preload less changes due to thermal deformation of the rotating shaft and the bearing 118 during high-speed operation of the fan motor, thereby easily securing reliability of the ball bearing.

In addition, since the cylinder 133 is provided with the spring mounting part 1331 to which the spring 130 is mounted, the housing 100 such as a separate sleeve surrounding a ball bearing, a coil spring or the like is unnecessary, thereby achieving a simplified structure, reduction of the number of components, and facilitation of assembly.

Moreover, the spring 130 and the cylinder 133 are directly assembled to the bearing housing 108 of the vane hub 106, which is advantageous in reducing the size and weight of the fan motor.

In addition, an axial length of the spring 130 is shorter than the diameter of the spring 130. The axial length of the spring 130 is shorter than the length of the cylinder 130. The cylinder 133 is rigid.

According to this, the structure of the spring 130 can be simplified. The material cost of the spring 130 may be reduced. The spring 130 may be formed of a metal material. Since the axial length of the spring 130 is shortened, the weight can be reduced.

In addition, the spring 130 has a structure that is surface-contactable and has a length shorter than a diameter, and does not require a separate cartridge such as a sleeve for fixing the spring.

3. Description of Configuration of Fan Motor According to Another Embodiment FIG. 9 is a perspective view illustrating a spring 230 in accordance with another embodiment of the present disclosure.

This embodiment is different from the embodiment of FIGS. 4 to 8 in view of the structure of the spring 230. Since other components are the same as or similar to those in the previous embodiment of FIGS. 4 to 8, a redundant description will be omitted and differences will be mainly described.

The spring 230 includes a first contact portion 231, an elastic portion 232 and a second contact portion 233.

The spring 230 may be formed in a cylindrical shape with a hollow hole therein. The hollow hole is formed through the spring 230 in the axial direction. A diameter of the hollow hole is larger than a diameter of the rotating shaft 102. The spring 230 may have a constant diameter.

The first contact portion 231 may be formed in a circular shape. The first contact portion may have a width that is narrower than a circumferential length thereof. Upper and lower surfaces of the first contact portion 231 may be flat surfaces. A thickness of the first contact portion 231 is defined between the upper and lower surfaces of the first contact portion 231.

The first contact portion 231 may extend spirally to be connected to the elastic portion 232. The first contact portion 231 and the elastic portion 232 may overlap each other in the longitudinal direction of the spring 230.

The upper surface of the first contact portion 231 may be in contact with one axial side surface of the first bearing 118a. The first contact portion 231 is disposed to come into contact with one axial side surface of the outer ring 119 of the first bearing 118a.

The lower surface of the first contact portion 231 may be in contact with one axial side surface of the elastic portion 232 to be explained later.

The elastic portion 232 includes a first curved part 2321 and a second curved part 2322. The first curved part 2321 may be convex upward. The first curved part 2321 is curved upward with a preset curvature along the circumferential direction.

The first curved part 2321 and the second curved part 2322 are connected to each other in the circumferential direction. The first curved part 2321 and the second curved part 2322 are provided in plurality, respectively, along the circumferential direction. In the embodiment disclosed herein, the first curved part 2321 and the second curved part 2322 are five each.

The first curved parts 2321 and the second curved parts 2322 are alternately disposed along the circumferential direction.

The second curved part 2322 may be concave downward. The second curved part 2322 is curved downward with a preset curvature along the circumferential direction. The curvature of the second curved part 2322 may correspond to the curvature of the first curved part 2321. An inflection point may be formed between the curve of the first curved part 2321 and the curve of the second curved part 2322.

The first curved part 2321 and the second curved part 2322 may extend along the circumferential direction. The first curved part 2321 and the second curved part 2322 may overlap each other in the longitudinal direction of the spring 230.

The first curved part 2321 and the second curved part 2322 may be formed to be stacked in a plurality of layers in the longitudinal direction of the spring 230. The first curved part 2321 and the second curved part 2322 may spirally extend, so that the elastic parts 232 of the plurality of layers adjacent in the vertical direction may be connected to each other.

Figure 9:
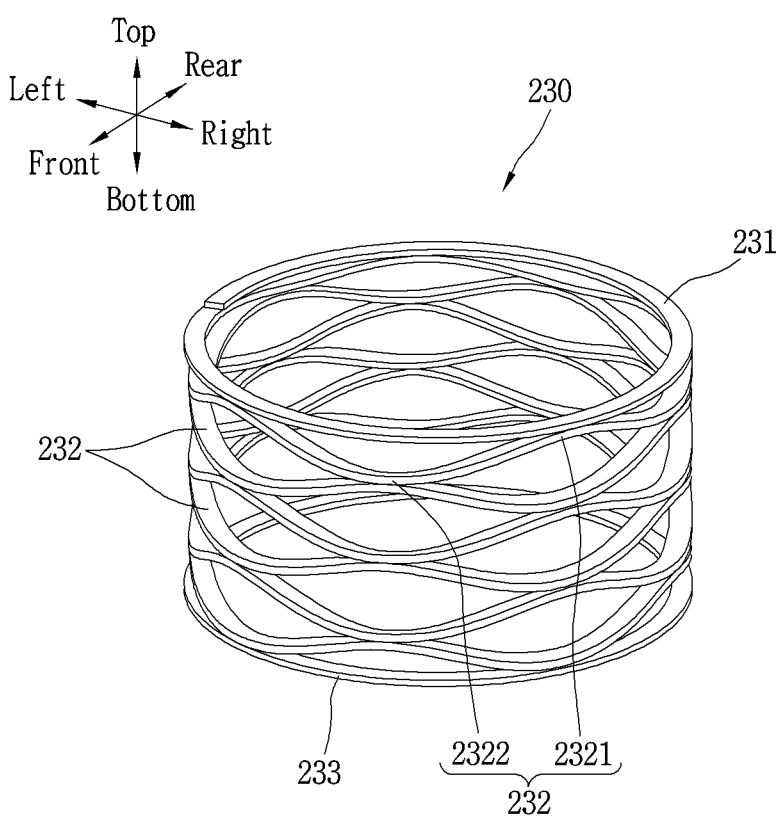
FIG. 9 is a perspective view illustrating a spring in accordance with another embodiment of the present disclosure.

Referring to FIG. 9, among the plurality of adjacent layers in the longitudinal direction of the spring 230, that is, in a vertical direction, the first curved part 2321 and the second curved part 2322 of the lower layer and the second curved part 2322 and the first curved part 2321 of the upper layer may be disposed alternately in the circumferential direction, and the first curved part of the lower layer and the second curved part 2322 of the upper layer may be in contact with or spaced apart from each other.

The highest portion of the first curved part 2321 of the lower layer and the lowest portion of the second curved part 2322 of the upper layer may be in contact with or spaced apart from each other in the circumferential direction.

When the spring 230 is compressed in the longitudinal direction, the first curved part and the second curved part 2322 are elastically deformed in the vertical direction, so that a spacing between the first curved part 2321 and the second curved part 2322 is reduced.

The second contact portion 233 may be formed in a circular shape. The second contact portion 233 may have a width that is narrower than a circumferential length thereof. Upper and lower surfaces of the second contact portion 233 may be flat surfaces. A thickness of the second contact portion 233 is defined between the upper and lower surfaces of the second contact portion 233.

The second contact portion 233 may extend spirally to be connected to the elastic portion 232. The second contact portion 233 and the elastic portion 232 may overlap each other in the longitudinal direction of the spring 230.

The lower surface of the second contact portion 233 may be in contact with one axial side surface of the cylinder 133. The second contact portion 233 is disposed to come into contact with one axial side surface of the spring mounting part 1331 of the cylinder 133.

Figure 10:
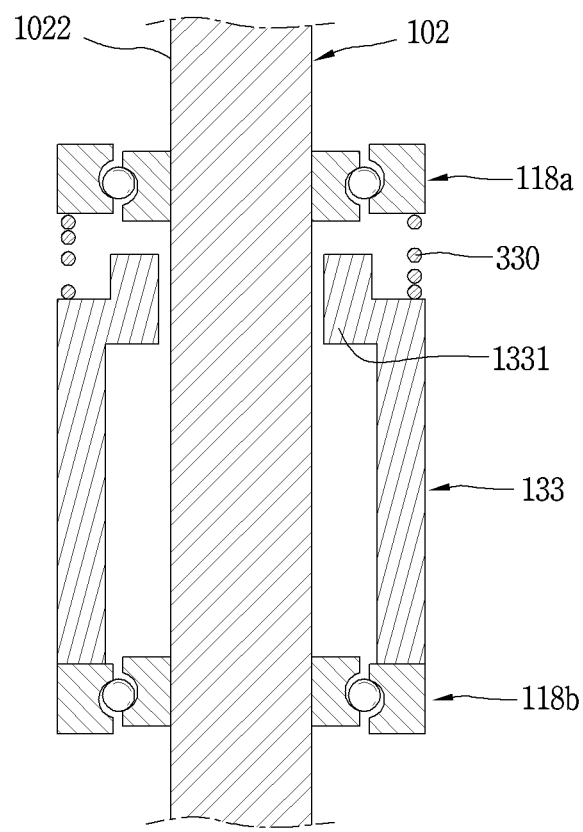
FIG. 10 is a conceptual view illustrating a state in which a spring and a cylinder apply a preload to a bearing in accordance with still another embodiment of the present disclosure.

4. Description of Configuration of Fan Motor According to Another Embodiment FIG. 10 is a conceptual view illustrating a state in which a spring 330 and a cylinder 133 apply a preload to a bearing 118 in accordance with still another embodiment of the present disclosure.

This embodiment is different from the embodiments of FIGS. 4 to 9 in view of the structure of the spring 330.

The spring 330 may be a coil spring. The spring 330 may extend spirally. The spring 330 may be formed in a cylindrical shape.

The spring 330 may have a constant diameter in the longitudinal direction. A hollow hole may be formed through an inside of the spring 330 such that the rotating shaft 102 is inserted therethrough.

An axial length of the spring 330 may be shorter than the diameter of the spring 330.

The axial length of the spring 330 may be shorter than the length of the cylinder 130.

One axial side of the spring 330 may be in contact with one axial side surface of the outer ring 119 of the first bearing 118a. Another side of the spring 330 may be disposed in contact with one axial side surface of the cylinder 133. The another side of the spring 330 may be fixedly mounted to the spring mounting part 1331 of the cylinder 133.

Another axial side surface of the cylinder 133 may be in contact with the one side surface of the outer ring 119 of the second bearing 118b.

Accordingly, the spring 330 is brought into contact with the first bearing 118a and the cylinder 133. Before the spring 330 and the cylinder 133 are mounted, the sum of the length of the spring 330 and the length of the cylinder 133 is greater than a distance between the inner ring of the first bearing 118a and the inner ring 120 of the second bearing 118b.

When the spring 330 and the cylinder 133 are mounted between the outer ring 119 of the first bearing 118a and the outer ring 119 of the second bearing 118b, the spring 330 may be compressed by the bearing 118a and the cylinder 133.

The compressed spring 330 may apply elastic pressing force to the first bearing 118a and the second bearing 118b as a reaction with respect to compressive force.

One axial side of the spring 330 applies a preload to the outer ring 119 of the first bearing 118a in the first axial direction. Another axial side of the elastic biasing spring 330 applies the preload to the outer ring 119 of the second bearing 118b in the second axial direction through the cylinder.

Since other components are the same as or similar to those in the previous embodiments of FIGS. 4 to 9, a duplicated description will be omitted.

In addition to the structure shown in the embodiments of FIGS. 4 to 10 described above, the spring may be configured as various types of leaf springs capable of being in surface-contact with one axial side surface of the outer ring of the bearing or one axial side surface of the cylinder.

What is claimed is:

1. A fan motor comprising:
   a rotating shaft that extends in an axial direction;
   an impeller coupled to the rotating shaft;
   a motor configured to drive the rotating shaft, the motor comprising (i) a rotor connected to the rotating shaft and (ii) a stator surrounding the rotor;
   a plurality of bearings that support the rotating shaft, each of the plurality of bearings comprising:
      an inner ring coupled to the rotating shaft,
      an outer ring spaced apart from the inner ring and disposed radially outward from the inner ring, and
      a plurality of balls disposed between the outer ring and the inner ring;
   a spring having a first axial side surface in contact with an axial side surface of the outer ring of one of the plurality of bearings; and
   a cylinder having (i) a first axial side in contact with a second axial side surface of the spring and (ii) a second axial side in contact with an axial side surface of the outer ring of another of the plurality of bearings,
   wherein the cylinder surrounds the rotating shaft,
   wherein the cylinder comprises a spring mounting part that supports the spring on the first axial side of the cylinder,
   wherein the spring mounting part protrudes radially inward from the first axial side of the cylinder toward the rotating shaft,
   wherein the cylinder further comprises a fixing protrusion that protrudes from an inner end portion of the spring mounting part toward the one of the plurality of bearings, and
   wherein the second axial side surface of the spring surrounds the fixing protrusion and is fitted to the fixing protrusion.

2. The fan motor of claim 1, wherein the spring has a cylindrical shape surrounding the rotating shaft, and
   wherein an axial length of the spring is less than a diameter of the spring.

3. The fan motor of claim 1, wherein a diameter of the cylinder is less than or equal to a diameter of the plurality of bearings.

4. The fan motor of claim 1, wherein the spring and the cylinder are mounted between the outer rings of the plurality of bearings,
   wherein a sum of lengths of the spring and the cylinder before being mounted between the outer rings is larger than a spaced distance between the inner rings of the plurality of bearings, and
   wherein the spring and the cylinder are configured to, based on being mounted between the outer rings, press the outer rings in the axial direction such that a portion of the outer rings protrude in the axial direction relative to the inner rings in the axial direction.

5. The fan motor of claim 4, wherein a ball among the plurality of balls is configured to define (i) a first contact point in contact with the outer ring and (ii) a second contact point in contact with the inner ring, and
   wherein a virtual straight line that passes through the first contact point and the second contact point is inclined with respect to the axial direction.

6. The fan motor of claim 1, wherein the spring comprises:
   a first contact part that defines the first axial side surface of the spring and is in contact with the axial side surface of the outer ring of the one of the plurality of bearings;
   a second contact part that defines the second axial side surface of the spring and is in contact with the first axial side of the cylinder, the second contact part being spaced apart from the first contact part in the axial direction; and
   an elastic part that is disposed between the first contact part and the second contact part and connects the first contact part and the second contact part to each other, the elastic part being configured to elastically deform based on a distance between the first contact part and the second contact part.

7. The fan motor of claim 6, wherein each of the first contact part and the second contact part has a circular shape, wherein the elastic part comprises:
   a first curved part that extends in a circumferential direction of the first contact part or the second contact part, the first curved part being convex toward the first contact part; and
   a second curved part that extends in the circumferential direction, the second curved part being concave toward the second contact part,
   wherein the first curved part and the second curved part are alternately disposed along the circumferential direction,
   wherein the elastic part is one of a plurality of elastic parts of the spring that overlap one another in the axial direction, and
   wherein the first curved part and the second curved part define different layers separated in the axial direction, and at least portions of the first curved part and the second curved part are in contact with each other.

8. The fan motor of claim 1, wherein the spring comprises a coil spring that has (i) the first axial side surface that is in contact with the axial side surface of the outer ring of the one of the plurality of bearings and (ii) the second axial side surface that is in contact with the first axial side of the cylinder.

9. The fan motor of claim 1, wherein the plurality of bearings are disposed between the impeller and the rotor.

10. The fan motor of claim 1, further comprising:
    a housing that accommodates the impeller and the rotating shaft;
    a vane hub accommodated inside the housing;
    a plurality of vanes that protrude from an outer circumferential surface of the vane hub to an inner circumferential surface of the housing, the plurality of vanes being coupled to the housing; and a bearing housing accommodated inside the vane hub, where the bearing housing accommodates the plurality of bearings, the spring, and the cylinder.

11. The fan motor of claim 10, further comprising a plurality of bridges that extend from an inner circumferential surface of the vane hub to an outer circumferential surface of the bearing housing and connect the vane hub to the bearing housing.

12. The fan motor of claim 11, wherein the bearing housing further comprises a stopper that protrudes radially inward from one axial end portion of the bearing housing, the stopper facing opposite to the impeller and being configured to restrict an axial movement of the outer ring, and
wherein the outer ring is in contact with the stopper, and the inner ring is spaced apart from the stopper in the axial direction.

13. The fan motor of claim 11, wherein the impeller comprises:
a hub that is accommodated inside the housing, the hub defining an accommodation space that accommodates a portion of the bearing housing; and
a plurality of blades that protrude from an outer circumferential surface of the hub toward the inner circumferential surface of the housing.

14. A fan motor comprising:
a rotating shaft that extends in an axial direction;
an impeller coupled to the rotating shaft;
a motor configured to drive the rotating shaft, the motor comprising (i) a rotor connected to the rotating shaft and (ii) a stator surrounding the rotor;
a plurality of bearings that support the rotating shaft, each of the plurality of bearings comprising:
an inner ring coupled to the rotating shaft,
an outer ring spaced apart from the inner ring and disposed radially outward from the inner ring, and
a plurality of balls disposed between the outer ring and the inner ring;
a spring having a first axial side surface in contact with an axial side surface of the outer ring of one of the plurality of bearings; and
a cylinder having (i) a first axial side in contact with a second axial side surface of the spring and (ii) a second axial side in contact with an axial side surface of the outer ring of another of the plurality of bearings,
wherein the spring comprises:
a ring portion that is axially spaced apart from the first axial side surface of the outer ring and surrounds the rotating shaft, and
an arm portion that protrudes from the ring portion toward the one of the plurality of bearings and is in contact with the axial side surface of the outer ring, the arm portion being configured to elastically deform in the axial direction based on contacting the axial side surface of the outer ring.

15. The fan motor of claim 14, wherein the arm portion comprises a first arm portion and a second arm portion that are connected to an outside of the ring portion and extend from the outside of the ring portion in opposite directions along a circumferential direction of the ring portion,
wherein the spring comprises plural pairs of arm portions including a pair of the first arm portion and the second arm portion,
wherein the plural pairs are spaced apart from each other in the circumferential direction of the ring portion, and
wherein each of the first arm portion and the second arm portion comprises:
a connecting part connected to the outside of the ring portion,
an inclined part that is inclined with respect to the connecting part and protrudes from the connecting part toward the one of the plurality of bearings, and
a contact part that is disposed at the inclined part and in contact with the axial side surface of the outer ring of the one of the plurality of bearings.

* * * * *